Figure 1:
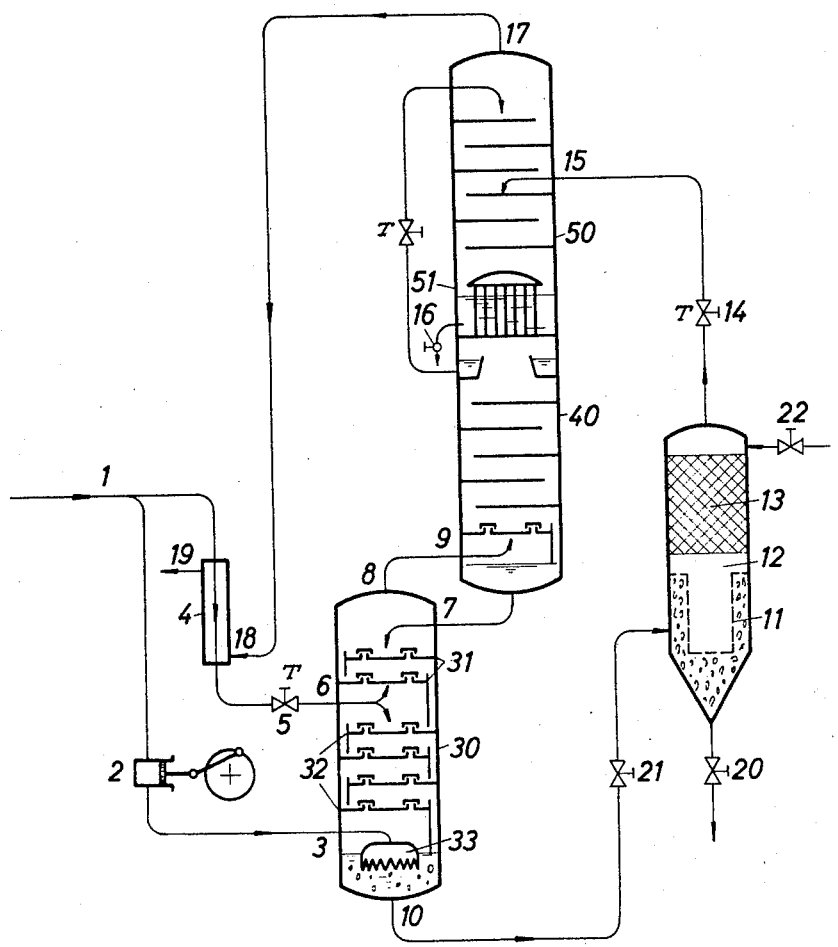

Nov. 5, 1963 E. KARWAT 3,109,726
PROCESS FOR REMOVING SOLID CARBON DIOXIDE
FROM AIR DURING ITS RECTIFICATION
Filed July 11, 1958 2 Sheets-Sheet 2

Inventor:
Ernst Karwat,
By Pierce, Scheffler & Parker
his Attorneys

United States Patent Office 3,109,726
Patented Nov. 5, 1963

3,109,726
PROCESS FOR REMOVING SOLID CARBON DIOXIDE FROM AIR DURING ITS RECTIFICATION
Ernst Karwat, Pullach im Isartal, Germany, assignor to Gesellschaft fur Linde's Eismaschinen Aktiengesellschaft, Hollriegelskreuth, near Munich, Germany, a company of Germany
Filed July 11, 1958, Ser. No. 747,882
Claims priority, application Germany July 31, 1957
9 Claims. (Cl. 62—13)

This invention relates to the art of separating carbon dioxide from the other constituents of atmospheric air, and is concerned with an improved process of, and apparatus for, separating solid carbon dioxide from air during fractionation of the latter.

In the past it was customary to remove carbon dioxide from air undergoing fractionation for the production of liquid oxygen, by absorbing the carbon dioxide in soda lye or its equivalent. More recently, it was proposed to eliminate this step, that is, to leave the carbon dioxide in the compressed air fed to the separator, to expand a part of the compressed air, after sufficient preliminary cooling, through a work-performing expansion machine with the exhaust of the expansion machine containing carbon dioxide as carbon dioxide "snow," to cool the rest of the air under pressure to a temperature above that at which solid carbon dioxide starts to separate, then to throttle it, with the carbon dioxide suspended in the liquid air, in the form of "snow," to bring liquid and gas in contact with each other, transferring the carbon dioxide "snow" from the gaseous to the liquid phase, to filter the liquid, to purify it over an adsorbent, and to feed it to the upper column of a two-column rectifying apparatus, while the gaseous portion of the air, which is free from the carbon dioxide "snow," is introduced into the pressure column.

A disadvantage of this method of operation is that the liquid obtained by throttling is not sufficient definitely to remove all carbon dioxide "snow" from the exhaust of the expansion machine. It was therefore suggested that the quantity of the wash liquor be increased by returning the spent wash liquor, by means of a circulation pump, to the head of the wash column after filtration of the carbon dioxide "snow."

According to another suggestion, the wash liquid—with which the carbon dioxide "snow" is washed from the gaseous air to be purified—is obtained in another way than by throttling, for example, by re-liquefying the air by means of cold nitrogen. In all cases, wash columns are provided outside the two-column rectifier for washing the air contaminated with carbon dioxide snow. This increases the costs of the plant and also the cooling losses.

The object of the present invention is to improve the washing action and to simplify the apparatus as compared to the known processes.

The new feature of the process according to the invention for eliminating solid carbon dioxide from air during the separation of the latter under pressure and cooling, in which the carbon dioxide is separated partly in the gaseous exhaust of a work-performing expansion machine and partly in the liquefied portion of throttled air as carbon dioxide "snow" which "snow" is transferred to the liquid by bringing the "snow"-containing gas in contact with liquefied gas and removed from it by filtration and adsorption before the liquid is expanded into the low-pressure rectifying column, is that in order to remove the carbon dioxide "snow," the air carrying the carbon dioxide "snow" is washed in a counter-current with a mixture of the liquefied portion of the throttled air and of the liquid formed in the main condenser from the gaseous air by additional pressure rectification, and simultaneously is rectified. Thus the quantity of the wash liquor for the separation of the carbon dioxide "snow" from the exhaust of the expansion machine is increased—compared to the known process where only the liquid formed by throttling is used—by that portion of liquid which is formed in the pressure column during the rectification of the washed gas current. Both partial streams of liquid are about equal. The amount of the wash liquor is thus doubled.

The elimination of the solid carbon dioxide from the air and the partial rectification of the air can be effected in a prewash column—separated from the pressure column—the upper part of which receives the liquid collecting in the bottom of the pressure column and the partial stream liquefied by throttling, while into the lower end of which is injected the gaseous air carrying carbon dioxide "snow" which has been expanded through the work-performing expansion machine, and which, after washing and rectification in the prewash column, is then fed to the lower end of the pressure column.

From the carbon dioxide-laden liquid accumulated at the bottom of the prewash column, solid carbon dioxide is separated in the known manner on a suitable filter, the remainder of the carbon dioxide being removed from the filtered solution by adsorption on an adsorbent, for example, silica gel, and the purified liquid expanded into the upper column of the two-column rectifier.

The prewash column is provided with exchange plates: two to three plates between the inlet of the pressure column liquid and the inlet of the liquid obtained by the throttling and a larger number of plates between the latter and the inlet for the gaseous air. The exchange plates may be bubble cap plates of the conventional type, but care has to be taken that the apparatus is so designed that the accumulation of carbon dioxide "snow" on the plates is prevented, as far as possible.

The advantage of doubling the wash liquor is that by this means is achieved a considerable degree of rectification of the air current entering the column from the bottom and of the liquid trickling down the column. The removal of the carbon dioxide from the gas is so effective that no special protective measures against the accumulation of carbon dioxide are necessary in the pressure column traversed subsequently by the gas.

According to another feature of the invention the process described is carried out in the simplest form by feeding, from the air compressed with its natural carbon dioxide content, cooled in counterflow with separation products, partly work-performing and partly expanded by throttling, the gaseous partial stream which has passed through the work-performing expansion machine and is charged with carbon dioxide snow into the lower section, and the partial air stream expanded by throttling, largely liquefied and charged with carbon dioxide snow, into a section several exchange plates higher in the pressure column of a two-column rectifying device.

In the last mentioned level, the liquid portion of the partial stream expanded by throttling combines with the liquid returning from the upper end of the rectifying pressure column and the portion of the throttled air which has remained gaseous combines with the gas current ascending from the bottom produced by the work-performing expansion and, already prerectified. The pressure column then takes over all the functions of the above described prewash column. At the bottom of it accumulates the liquid subsequently to be purified in the known manner by filtration and adsorption and to be expanded into the upper column. The advantage of this embodiment is an unsurpassed simplicity of the process and of the apparatus, with the elimination of all preliminary purifying devices described in the prior publications.

In the separation of air containing carbon dioxide, according to the above described process, the temperature prior to the throttle valve must be above that at which solid carbon dioxide starts to separate, that is, about 10 to 12° C. higher than in the separation of the carbon dioxide-free air. The temperature is increased by sending more air in counterflow to the nitrogen arriving from the rectifying column to be heated. Then, less air will flow to the expansion machine. Compared to the operation with carbon dioxide-free air, the quantity of liquid formed by throttling is changed only slightly, and consequently also the refrigeration by throttling. On the other hand, since less air undergoes work-performing expansion, the amount of cold available from it drops considerably. The result is that a substantial part of the oxygen produced can only be obtained in gaseous—rather than liquid—form.

According to another feature of the invention, the fraction of air undergoing work-performing expansion, and thus the refrigeration, is increased by heating the nitrogen before it enters the throttled air and heat exchanger, with liquids formed during rectification. Thus less air has to be fed to the throttle to maintain the prescribed temperature before throttling. That the amount of wash liquor for the removal of the carbon dioxide is also diminished by this is compensated to a great extent by the addition of pressure column liquid to the throttling liquid according to the invention. Without the increase of the wash liquor according to the invention, this advantageous step can not be realized to the same extent, due to lack of wash liquor. Known methods can be used for heating the nitrogen arriving from the head of the upper column: the most effective is heat exhange with pressure column liquid before it is expanded into the upper column; also, heat exchange with liquid nitrogen before the latter is expanded into the upper column, and finally heat exchange with liquid or gaseous oxygen in order to liquefy or supercool it.

The result of these measures is an increase in the production of liquid oxygen, and enhancement of its purity, to an amount equal to that obtained in the separation of carbon dioxide-free air, while the entire investment costs and operating costs of the lye purification are saved.

If, according to another feature of the invention, the preliminary washing and the first stage of the rectification are effected, for instance by limiting the height of the bath of the liquid oxygen in the main condenser at a pressure between 5.2 and 20 kg./sq. cm., which is thus higher than necessary, and condensing the gaseous nitrogen formed in the main condenser in a bath of liquid oxygen boiling at 1.2 atm., for example, at 10 atm., the pressure column liquids are substantially hotter than if they were produced under 5.2 atm., i.e., at 10 atm. 108° K. instead of 98° K. at 5.2 atm. The nitrogen issuing from the upper column can be heated to a much higher temperature, before it is subjected to heat exchange with the throttling liquid—to 106° K. in the above example under 10 atm. pressure in the preliminary rectification. Then the desired effects will be realized to a still greater degree: reduction of the throttled air; increase of the quantity of air undergoing work-performing expansion; improvement in refrigeration.

Figure 2:
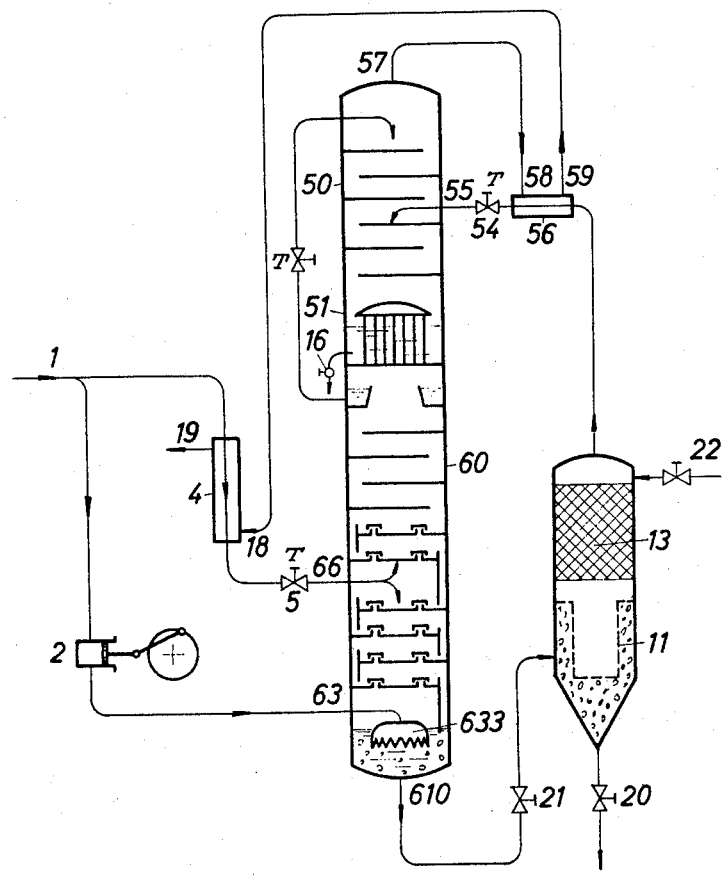

The process and its realization are described below in greater particularity, and with reference to the appended drawing, in which:

FIG. 1 is a schematic representation of one form of apparatus operable for carrying out the process of the present invention; and FIG. 2 is a schematic representation of a modification of the apparatus shown in FIG. 1, wherein the prewash column has been eliminated.

In FIG. 1, at 1 two partial streams are formed from 1000 cubic meters (normal) of air containing carbon dioxide at 200 atm. pressure, after preliminary cooling to from about 0° to —20° C. 500 cubic meters (normal) flow to the air expansion machine 2, where they undergo work-performing expansion, with the temperature dropping to about —150 to —160° C., and are introduced into the lower section of the prewash column 30 at 3. They contain about 330 cubic centimeters (normal) of carbon dioxide per cubic meter of air in the form of carbon dioxide "snow." 500 cubic meters (normal) of the high pressure air are cooled in the counter-flow cooler 4, by means of cold nitrogen, to —150° C., expanded in the throttle valve 5 to about 5.5 atm. and introduced at 6, mostly liquefied, into the prewash column 30. The liquid arriving from the bottom of the pressure column 40 is introduced into the prewash column 30 at 7. At 8 the gas ascending in the prewash column 3 and free of carbon dioxide leaves the prewash column and enters at 9 into the lower end of the high pressure column 40. In the sump of the prewash column the liquid, in which the entire carbon dioxide of the air is suspended as "snow," accumulates. It leaves the prewash column at 10, is conducted to the filter 11, for example, a metal frit, where the solid carbon dioxide is retained. After passing through the filter, the liquid still contains, at 12 for example, about 20 to 30 parts per million of $CO_2$. This is removed from the solution by adsorption on a layer of silica gel 13. Two filter-adsorber sets 11—13 are provided, and are interchangeable. The purified liquid contains only 0.1 to 0.5 parts per million $CO_2$. It passes through the valve 14 and at 15 is introduced onto the plates of the upper column 50 of the two-column rectifier. Rectification in the upper column produces in the known manner 193 cubic meters (normal) of liquid oxygen and 9 cubic meters (normal) of gaseous oxygen, which are withdrawn at 16 and 51 respectively and 798 cubic meters (normal) of gaseous nitrogen with 0.9% of $O_2$, which leaves the head of the column at 17, entering the counter-flow cooler 4 at 18 and leaving it at 19, thereby cooling the throttled air passing through cooler 4.

Two bubble cap plates 31, 31 are provided in the prewash column 30 between the inlet 7 for the pressure column liquid and the inlet 6 for the liquid obtained by throttling, and, by way of example, four plates 32, 32, between the inlet 6 for the liquid obtained by throttling and inlet 3 for the exhaust from the expansion machine 2. A toothed hood 33 dips with its teeth into the surface of the liquid at the bottom of the wash column 30. It causes the carbon dioxide "snow" to become wetted with liquid, and precipitates the major part of the "snow" at this point. The rest of the carbon dioxide is absorbed by the liquid trickling down over the plates.

The simplest form of realization of the process according to the invention is shown in FIG. 2, again for the separation of 1000 cubic meters (normal) of air containing carbon dioxide per hour, of which 560 cubic meters undergo work-performing expansion in the expansion machine 2 and 440 cubic meters are cooled in the counter-flow cooler 4 to —150° C. and adiabatically expanded in the throttle valve 5. The gas stream which has undergone work-performing expansion is introduced at 63 into the high pressure column 60 of a two-column apparatus, and the liquid expanded by throttling is introduced at 66. Between the two inlets the pressure column is equipped with bubble cap plates, in whose construction provision is made, if necessary, to guard against the accumulation of solid carbon dioxide, likewise some bubble cap plates above the inlet for the liquid obtained by throttling. The toothed hood 633 has the same function as the hood 33 shown in FIG. 1. The pressure column liquid is taken from the lower end of the pressure column at 610, as described in FIG. 1, is liberated from carbon dioxide in the filter 11 and adsorber 13, and fed through the valve 54 into the upper column 50 at 55 after it has been cooled in the heat exchanger 56 by about 10° by means of the nitrogen flowing from 57 over 58 and 59 through the heat exchanger. The temperature of the nitrogen is raised in this flow by 18°, to 96° K. Now the counterflow of throttled air is only 440 cubic meters (normal), instead of the 500 cubic meters (normal) of the first example.

The improvement in the cold balance manifests itself in that now 20 cubic meters (normal) of liquid oxygen, 2 cubic meters (normal) of gaseous oxygen and 796 cubic meters (normal) of nitrogen with 0.6% of $O_2$ are obtained. Again, all investment costs and operating costs for lye purification are saved.

The technical device shown in FIG. 2, which is to some extent known from air separation technique, is novel in the present relation. The invention eliminates the possible disadvantage of the pressure column's becoming inoperative if air containing carbon dioxide is processed therein. Beyond that, the manner of operation, compared to the known methods of air separation, is characterized by the elimination of lye purification, by adjusting the temperature of the air current by special means before the throttle valve 5, by the use of a suitable filter and by the application of a specific minimum amount of gel for the purification of the filtrate.

If a coat of solid carbon dioxide is formed on the outside of the filter when filtering off the solid carbon dioxide from the pressure column liquid, the flow resistance of the filter increases with increasing thickness of the coat. In order to keep the amount of filtered liquid constant, and thus also the liquid level in the sump of the prewash column 30 and of the high pressure column 69, respectively, it is necessary to readjust the amount of the liquid by the valve 14. If this is not done, the height of the sump liquid will increase in the above mentioned columns. Changing filter resistances disturb the operation. In order to prevent this, the carbon dioxide in the liquid fed to the filter vessel is enriched, according to another feature of the invention, up to a consistency which just makes the mixture still fluid, and in addition, a filter of high permeability is used. These two measures have an advantageous effect in various respects: first, the pressure drop of the liquid flowing through the filter remains small. Second, the removal of the "snow" from the filter vessel is extremely easy and rapid, which will be discussed later.

The filtrate then contains about 3 to 5 times as much carbon dioxide as does a saturated solution, for example, 20 to 40 pM carbon dioxide. The final rectification of the filtrate with an adsorbent such as silica gel, requires more gel than the purification of liquids filtered in the usual manner, practically at least 0.4 kg. silica gel per 1000 cubic meters (normal) of processed air. The increase of the supply of gel becomes irrelevant however, in view of the advantage of an extremely satisfactory removal of acetylene from the pressure column liquid. The amount of gel used according to the invention is 10 times greater than the amount normally used for the adsorption of acetylene from the pressure column liquid. Acetylene is thus removed completely, particularly since it is fixed much more firmly by the gel than is carbon dioxide; it even displaces adsorbed carbon dioxide from the gel. The measures employed thus also protect the air separator against acetylene explosions.

If the carbon dioxide "snow" in the pressure column liquid fed to the filter vessel is enriched up to a consistency where the mixture is just still fluid and this mixture is drained from the filter vessel at the bottom after closing the valves 14 and 21 in FIG. 1 and relieving the pressure by means of the valve 22 more than 90% of the "snow" in the filter vessel will be removed in a very short time, and it is sufficient to pass a small amount of dry, carbon dioxide-free nitrogen from the valve 22 over the gel layer 13, then from the inside toward the outside through the filter 11 and the valve 20, to make both the adsorber and the filter usable again. After the supernatant, liquid, nitrogen-oxygen-mixture has evaporated from the drained mixture, solid carbon dioxide is left, in a slightly lumpy form. It contains any and all oil constituents which may have been carried along from the expansion machine, but is nevertheless quite suitable for cooling purposes. In the conventional method, where the total amount of carbon dioxide is evaporated with nitrogen in the filter vessel, the oil is enriched in the filter vessel to an inadmissible degree. The new purifying method is free from this disadvantage.

I claim:
1. A process for removing solid carbon dioxide from gaseous air during the fractionation thereof by compression and cooling, which comprises
    providing a first stream and a second stream of said gaseous air from a source of air under pressure;
    expanding said first stream with production of external work, whereby carbon dioxide condenses and is entrained by the gas as snow;
    liquefying part of said second stream of gaseous air by cooling and throttling, carbon dioxide being precipitated in this liquid as snow;
    washing and rectifying said gaseous first stream with a mixture of the liquefied part of the second stream and liquid obtained by rectifying the gaseous first stream and the gaseous part of the second stream in the high pressure column of a two-stage rectifier;
    thus suspending all the carbon dioxide in the liquid mixture; simultaneously rectifying the gaseous part of said second stream with the liquid obtained by rectification in the high pressure column;
    cleaning said liquid mixture by filtration and adsorption; and
    leading it into the low-pressure stage of the two-stage rectifier.

2. A process according to claim 1, characterized in that the rectification of and the $CO_2$-removal from the first and second streams is effected in a prewash and rectifications column, to the head of which is led the sump liquid of the high pressure column of the rectifier and from the head of which the carbon dioxide free gas stream is passed to the high pressure column, whilst the washing liquid laden with carbon dioxide is taken from the bottom of said prewash and rectification column, filtered and cleaned by adsorption and passed into the low-pressure column.

3. A process according to claim 2, characterized in that the prewash and rectification column is operated at a pressure between 5.2 and 20 kg./cm.$^2$ (73.96 and 284.46 lbs./sq. in.).

4. A process according to claim 2, characterized in that the prewash and rectification column is operated at a pressure of about 10 kg./cm.$^2$ (142.23 lbs./sq. in.).

5. A process according to claim 1, characterized in that nitrogen, coming from the head of the low-pressure stage of the two-stage rectifier is warmed up by heat exchange with said cleaned liquid mixture before it is brought to heat exchange with high pressure air.

6. Process as defined in claim 1 in which said first carbon dioxide containing stream is fed into the lower section of the high pressure column of a two-stage rectifier, and the second carbon dioxide containing stream is fed into the medium section of said high pressure column and the washing liquid laden with the carbon dioxide is taken from the bottom of said pressure column, filtered and cleaned by adsorption and passed into the low-pressure column, and in which the adsorption is effected by means of at least 0.4 kg. (0.88 lb.) of silica gel per 1000 cubic meters (1307.9 cubic yards) of air treated.

7. Process as defined in claim 1 in which said first carbon dioxide containing stream is fed into the lower section of the high pressure column of a two-stage rectifier, and the second carbon dioxide containing stream is fed into the medium section of said high pressure column and the washing liquid laden with the carbon dioxide is taken from the bottom of said pressure column, filtered and cleaned by adsorption and passed into the low-pressure column, and in which the adsorption is effected by means of at least 0.5 kg. (1.1 lbs.) of alumina per 1000 cubic meters (1307.9 cubic yards) of air treated.

8. Process as defined in claim 1 in which the liquid mixture, in which all the carbon dioxide is suspended, is fed to a filter vessel where the carbon dioxide is only enriched to a very viscous flowable consistency and is drained from the filter vessel.

9. A process for removing solid carbon dioxide from air during the fractionation thereof by compression and cooling, which comprises providing a first stream and a second stream of said air from a source of air under pressure; expanding said first stream with production of external work to condense carbon dioxide, the carbon dioxide being entrained by the gas as snow; feeding said first carbon dioxide-containing stream into the lower section of the high pressure column of a two-stage rectifier; liquefying part of said second stream of air by cooling and throttling, carbon dioxide being precipitated in this liquid as snow; feeding said liquefied part of the second stream and gaseous part of the second stream into the middle section of said high pressure column; washing and rectifying said gaseous first stream with a mixture of (a) the liquefied part of the second stream and (b) liquid obtained by rectifying the gaseous first stream and the gaseous part of the second stream in the high pressure columns of said two-stage rectifier, accumulating thus all of the solid carbon dioxide in the liquid mixture; simultaneously rectifying the gaseous part of the second stream with said liquid obtained by rectification in the high pressure column; withdrawing said carbon dioxide-containing liquid mixture from the bottom of said high pressure column; cleaning said liquid mixture by removing solid carbon dioxide therefrom by filtration and adsorption; and feeding the cleaned liquid into the low pressure column of said two-stage rectifier.

References Cited in the file of this patent

UNITED STATES PATENTS

| | | |
|---|---|---|
| 1,549,236 | Van Nuys | Aug. 11, 1925 |
| 2,256,421 | Borchardt | Sept. 16, 1941 |
| 2,413,752 | Dennis | Jan. 7, 1947 |
| 2,423,543 | Yendall | July 8, 1947 |
| 2,572,933 | Houvener | Oct. 30, 1951 |
| 2,655,796 | Rice | Oct. 20, 1953 |
| 2,777,299 | Shaperdas | Jan. 15, 1957 |
| 2,840,994 | Lobo et al. | July 1, 1958 |
| 2,924,078 | Tsunoda | Feb. 9, 1960 |
| 2,997,854 | Schilling | Aug. 29, 1961 |
| 3,039,274 | Matsch | June 19, 1962 |

FOREIGN PATENTS

| | | |
|---|---|---|
| 375,178 | Germany | May 1, 1923 |
| 633,686 | Germany | Aug. 4, 1936 |